(12) United States Patent
Schwarzkopf et al.

(10) Patent No.: US 8,018,188 B2
(45) Date of Patent: Sep. 13, 2011

(54) METHOD AND DEVICE FOR DETERMINING THE POSITION OF A ROTOR OF A BRUSHLESS AND SENSORLESS ELECTRIC MOTOR

(75) Inventors: Johannes Schwarzkopf, Marktheidenfeld (DE); Karsten Lohse, Wuertburg (DE); Pietro De Filippis, Milan (IT)

(73) Assignee: Brose Fahrzeugteile GmbH & Co. Kommanditgesellschaft Würzburg, Würzburg (DE)

( * ) Notice: Subject to any disclaimer, the term of this patent is extended or adjusted under 35 U.S.C. 154(b) by 315 days.

(21) Appl. No.: 12/309,279

(22) PCT Filed: Jul. 5, 2007

(86) PCT No.: PCT/EP2007/056845
§ 371 (c)(1),
(2), (4) Date: May 5, 2009

(87) PCT Pub. No.: WO2008/006771
PCT Pub. Date: Jan. 17, 2008

(65) Prior Publication Data
US 2010/0019710 A1     Jan. 28, 2010

(30) Foreign Application Priority Data
Jul. 13, 2006 (DE) .................. 10 2006 032 491

(51) Int. Cl.
*H02P 6/16* (2006.01)
*H02P 25/00* (2006.01)
(52) U.S. Cl. ........... 318/400.35; 318/400.34; 318/254.1; 318/254.2
(58) Field of Classification Search .................. 318/599, 318/123, 400.01, 400.34, 400.35, 254.1, 318/254.2
See application file for complete search history.

(56) References Cited

U.S. PATENT DOCUMENTS
5,481,166 A * 1/1996 Moreira ................... 318/400.04
(Continued)

FOREIGN PATENT DOCUMENTS
DE     4211982 A1     1/1993
(Continued)

OTHER PUBLICATIONS
DE Office Action in Corresponding 102006032491.9 dated Mar. 5, 2007.
(Continued)

*Primary Examiner* — Thomas M Dougherty
(74) *Attorney, Agent, or Firm* — Manelli Selter PLLC; Edward J. Stemberger

(57) ABSTRACT

The invention relates to a method carried out with simple means for determining the position of the rotor in a sensorless and brushless multi-phase electric motor (1) in addition to a device particularly suitable for carrying out said method. According to said method, a phase voltage ($U_v$) on the clamping side on said motor phase is to be detected after clamping a first motor phase (V) from the reference potentials ($U_z$,M) of an intermediate circuit (7) during a detection period ($T_E$), via which the detection period ($T_E$) determines a peak value ($U_v^*$) of the detected phase voltage ($U_v$), the peak values ($U_v^*$) are to be compared to the comparative value ($U_c$), and a positon signal ($S_P$) is to be produced when the peak value ($U_v^*$) exceeds the comparative value (U0). The comparative value ($U_c$) is then determined digitally such that it corresponds to the value of the phase voltage ($U_v$) at a zero crossing of a voltage ($U_{Vind}$) induced in the first motor phase (V) or an increased or lowered value in relation to a predefined correction value ($\Delta Q$).

20 Claims, 5 Drawing Sheets

U.S. PATENT DOCUMENTS

| | | | | |
|---|---|---|---|---|
| 5,783,917 | A * | 7/1998 | Takekawa | 318/400.1 |
| 5,929,577 | A * | 7/1999 | Neidorff et al. | 318/400.35 |
| 6,023,141 | A * | 2/2000 | Chalupa | 318/400.35 |
| 6,081,084 | A * | 6/2000 | Crecelius | 318/400.35 |
| 6,232,730 | B1 | 5/2001 | Doyama et al. | |
| RE37,360 | E * | 9/2001 | Duncan | 318/281 |
| 2005/0258788 | A1* | 11/2005 | Mori et al. | 318/254 |
| 2006/0197482 | A1* | 9/2006 | Harwood | 318/439 |

FOREIGN PATENT DOCUMENTS

| | | |
|---|---|---|
| DE | 10152427 A1 | 10/2002 |
| DE | 10347208 A1 | 5/2004 |
| DE | 102004005521 A1 | 8/2004 |
| DE | 10152427 B4 | 6/2006 |
| EP | 1689072 A2 | 8/2006 |
| WO | WO 0182464 A1 | 11/2001 |
| WO | WO 2005025050 A1 | 3/2005 |
| WO | WO 2005/062460 A1 | 7/2005 |

OTHER PUBLICATIONS

ISR in PCTEP2007/056845 dated Feb. 19, 2008.

* cited by examiner

METHOD AND DEVICE FOR DETERMINING THE POSITION OF A ROTOR OF A BRUSHLESS AND SENSORLESS ELECTRIC MOTOR

FIELD OF THE INVENTION

The invention relates to a method for determining the position of the rotor in a polyphase brushless and sensorless electric motor such as is used in particular for operating a fan for a motor vehicle engine. The invention furthermore relates to a device for carrying out the method.

BACKGROUND OF THE INVENTION

In a so-called brushless electric motor, the drive current is commutated electronically. For this purpose, the electric motor is usually assigned a converter circuit that is supplied with voltage via an electrical intermediate circuit. The converter circuit passes to the stator coils of the electric motor an electric three-phase current, which generates a stator magnetic field that rotates relative to the stator. The rotor of the electric motor often has one or more permanent magnets that generate a rotor magnetic field that is static relative to the rotor. The interaction of the stator magnetic field with the rotor magnetic field results in a torque that sets the rotor in motion.

The phases of the three-phase current generated by the converter circuit and of the associated stator magnetic field are referred to as motor phases. In the figurative sense, this expression also denotes the stator coils respectively assigned to such a phase with the associated connecting lines. The motor phases are often connected up to one another in a star connection. The converter circuit drives the motor phases depending on the rotor position, which has to be determined metrologically for this purpose. Sensors, such as e.g. Hall sensors, are often provided for determining the position, that is to say determining the angle of rotation, of the rotor. Often, and not least for cost reasons, sensorless angle-of-rotation transmitters are alternatively used for this purpose. The position determination is effected by said angle-of-rotation transmitters by detection of the so-called back electromotive force (also referred to as back-EMF) of the electric motor. This expression denotes the voltage induced in the stator coils by the rotating rotor magnetic field. Motors of this design are referred to as sensorless electric motors.

Conventional sensorless angle-of-rotation transmitters are usually embodied as analog electronic circuits. Such a circuit determines the back-EMF by detection and analysis of all the phase voltages. In order to prevent fluctuations of the phase voltages that arise as a result of switching processes or a pulse width modulation (PWM) from leading to an erroneous position determination, a conventional angle-of-rotation transmitter usually additionally comprises suitable filter circuits that filter out these disturbances. The resulting back-EMF is compared with a comparison voltage in a comparator, wherein the comparator generates a position signal if the back-EMF exceeds a predetermined comparison value.

The position signal is conventionally generated upon a positive zero crossing of the back-EMF (that is to say upon a change in sign of the back-EMF from negative to positive). As an alternative to this, it is customary to operate an electric motor with pretriggering or with posttriggering. The comparison voltage is adapted for this purpose in such a way that the position signal is initiated before or respectively after the zero crossing of the back-EMF.

The back-EMF can only be measured in a motor phase in which the motor current has stopped. In order to measure the back-EMF in a motor phase, therefore, even after the disconnection of this motor phase from the reference potentials of the intermediate circuit, it is necessary to wait during a so-called commutation time period, within which the so-called freewheeling current in the motor phase decays. In this case, freewheeling current denotes the current which is temporarily maintained by the inductive inertia of the motor phase even after the disconnection of the latter. In order to measure the freewheeling current, a conventional angle-of-rotation transmitter is often assigned a separate circuit that initiates or enables the position determination only when the freewheeling current has decayed.

The position signal output by the angle-of-rotation transmitter is usually fed to a microcontroller, which drives the converter circuit, as "trigger signal".

SUMMARY OF THE INVENTION

The invention is based on the object of specifying a method for determining the position in a brushless and sensorless electric motor, which method can be implemented structurally simply and inexpensively, and also a device that is particularly suitable for carrying out the method.

With regard to the method, this object is achieved according to the invention by means of the features of claim 1. Accordingly, provision is made for detecting the phase voltage after the disconnection of a motor phase in which the back-EMF is intended to be analyzed, during a detection time period, and for determining a peak value of said phase voltage over the detection time period. Said motor phase whose phase voltage is tapped off is designated hereinafter as first motor phase. Notwithstanding this designation, however, any desired motor phase of the electric motor can be selected for this purpose.

The phase is disconnected by being isolated from both reference potentials of the intermediate circuit—namely an operating potential, which is usually chosen to be positive, and ground. The maximum value, if appropriate freed of disturbing influences, which is assumed by the phase voltage from the beginning of the detection time period up to a present point in time is designated as the peak value.

Said peak value is subsequently compared with a comparison value, wherein a position signal is generated if the peak value exceeds the comparison value. In this case, said comparison value is determined numerically in such a way that it corresponds to the value of the phase voltage at a zero crossing of the voltage induced in the first motor phase, that is to say of the back-EMF. In order to realize a pre- or posttriggering, it is alternatively provided that the comparison value is increased or decreased by a predetermined correction value in relation to the value corresponding to the zero crossing of the back-EMF.

The invention is based on the insight that the structural outlay required for carrying out a position determining method can be considerably reduced if individual steps of the method are carried out numerically rather than by analog electronic circuitry. This is because, for carrying out numerical algorithms, the microcontroller provided as standard anyway in a motor control can be upgraded in terms of programming, and thus without additional structural outlay.

In this case, a crucial simplification of the method is made possible by the insight that for determining the back-EMF in the first motor phase, a measurement of the phase voltages of the further motor phases is not absolutely necessary, rather at least one phase voltage of one of the further motor phases can either be calculated or it is possible to obviate the determination of this phase voltage by suitable mathematical transformation of the underlying equations and/or by structural measures. Preferably, only a single phase voltage, namely that of the first motor phase, is determined metrologically.

The peak value of the phase voltage detected is preferably formed and made available in the form of an analog signal by an electronic circuit, which, as is known, can be realized simply and inexpensively. By contrast, the comparison of the peak value with the comparison value is preferably effected numerically, such that a separate comparator is not necessary for this purpose.

In the course of the peak value detection, fluctuations of the phase voltage such as are caused by switching processes (so-called "switching overshoots" of the phase voltage) are expediently filtered out in order not to corrupt the peak value and to preclude a position determination error caused thereby.

In a simple and expedient embodiment of the method according to the invention the comparison value is determined according to the formula $U_V \approx U_Z/2 + \Delta Q$. In this case, $U_Z$ represents an operating potential of the intermediate circuit, in particular 15 volts with respect to ground. $\Delta Q$ generally represents the correction value, which, for setting the pre- or posttriggering, can assume a negative or positive value or else the value 0. In this case, the operating potential is preferably detected metrologically by the first motor phase being connected to the operating potential before the beginning of the detection time period. The operating potential can then be derived in a simple manner from the peak value of the phase voltage that is determined in this state.

The detection time period is expediently preceded by a commutation time period, the duration of which is determined by the decay of the freewheeling current flowing in the first motor phase. In this case, the end of the commutation time period is advantageously determined in turn by repeated detection and analysis of the peak value of the phase voltage. In this case, the commutation time period is identified as terminated if the peak value falls below a predetermined threshold value.

With regard to the device, the object is achieved according to the invention by means of the features of claim 9. Accordingly, for determining the peak value, an analog electronic evaluation circuit is provided, which passes a measurement signal of the determined peak value for the further numerical method implementation to an analog connection of a microcontroller. In this case, the microcontroller is designed in terms of programming to compare the peak value with a comparison value and to generate a position signal if the peak value exceeds the comparison value. The microcontroller is furthermore designed for numerically determining the comparison value in accordance with the method described above.

In a preferred and particularly simple embodiment, the evaluation circuit is essentially formed by a first capacitor and a first diode. In this case, the first capacitor is connected between a voltage tap of the phase voltage of the first motor phase and ground. The diode is interposed between the motor phase and the capacitor in the forward direction. In order to prevent an overdriving of the analog connection of the microcontroller in the case of a high motor rotational speed and correspondingly high values of the back-EMF, a voltage divider circuit is expediently connected upstream of the evaluation circuit, a voltage reduced substantially proportionally to the phase voltage being fed to the first diode by means of said voltage divider circuit.

A second diode connected in parallel with the first diode is advantageously arranged within the voltage divider circuit. Said second diode serves firstly to compensate for production-, ageing- and temperature-dictated tolerances of the diode voltage of the first diode which could corrupt the result of the subsequent numerical method implementation. In this case, a particularly good compensation is accomplished by an embodiment structurally identical to the first diode being used as the second diode. In particular, an electronic structural unit containing both diodes is used, especially as the diodes of such an integrated structural unit generally have extremely similar characteristic data.

In addition, in a particularly advantageous embodiment of the evaluation circuit, the second diode permits a reversible activation and deactivation of the voltage divider circuit. For deactivation, that end of the voltage divider which is on the ground side in the active state is set to a voltage corresponding to the operating potential and the second diode is thereby inhibited. The activation and deactivation of the voltage divider are advantageously performed by the microcontroller in a structurally simple manner. For this purpose, a digital connection of the microcontroller is connected to the voltage divider.

For filtering out fluctuations of the phase voltage that are governed by switching processes, a second capacitor is preferably connected in parallel with the first capacitor and the first diode.

In one preferred embodiment of the invention, a position determination is made possible even when the electric motor is in so-called freewheel. The expression "freewheel" (which represents a phenomenon that is totally independent of the expressions "freewheeling diode" and "freewheeling current") describes an operating state of the motor in which the rotor is set in motion without the motor phases being energized. An electric motor is in freewheel typically during coasting after the motor current has been switched off. In addition, an electric motor used for operating a fan can also be put into freewheel by an air flow acting on the fan. The position determination in freewheel is made possible in a particularly simple manner by a defined test voltage being applied to the further motor phases in the de-energized state. It is expediently realized in a particularly simple manner by each of the further motor phases being connected to the center tap of a voltage divider circuit. In this case, the voltage divider circuit is embodied with sufficiently high impedance such that it does not significantly influence the motor driving.

In one advantageous development of the device, the analog connection of the microcontroller that is connected to the evaluation circuit can be configured both as input and as output. In the configuration as input, the analog connection serves for the acceptance and analog-to-digital conversion of the peak value fed by the evaluation circuit. Configured as output, the analog connection serves for the simple and expedient resetting of the evaluation circuit to an initial state. In particular, for this purpose the analog connection is allocated a zero signal as output. In this state, the analog output is internally connected to ground, such that the capacitor of the evaluation circuit is discharged via the microcontroller.

BRIEF DESCRIPTION OF THE DRAWINGS

Exemplary embodiments of the invention are explained in more detail below with reference to a drawing, in which.

Mutually corresponding parts and variables are always provided with the same reference symbols in all the figures.

DESCRIPTION OF THE PREFERRED EMBODIMENTS

Figure 1:
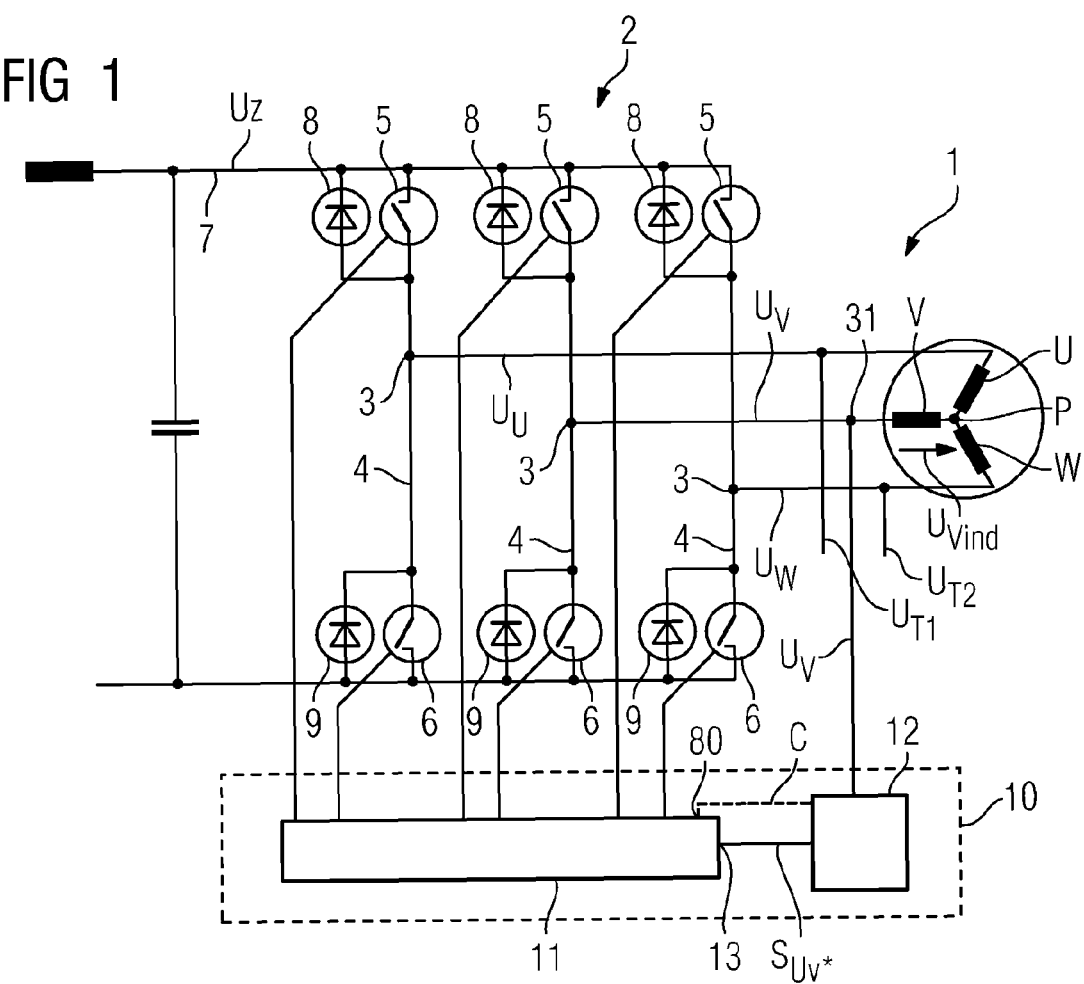
FIG. 1 shows a block diagram of a brushless and sensorless polyphase electric motor with a converter circuit and with a control unit for determining the rotor position and for driving the electric motor, comprising an evaluation circuit and a microcontroller that drives the converter circuit.

FIG. 1 shows a block diagram of a brushless and sensorless electric motor (motor 1 hereinafter for short), which is assigned a converter circuit 2 for power supply purposes. The motor 1 illustrated is embodied in three-phase fashion and thus comprises three motor phases U, V and W each having an armature winding arranged in the stator of the motor 1. The motor phases U, V, W are connected up to one another in star connection, by way of example, and are thus conductively connected to one another at a star point P. However, the method described below can also be applied to electric motors having motor phases connected up differently, in particular motor phases connected up in delta connection.

The respectively opposite connection end of each motor phase U, V, W in relation to the star point P (said connection end also being referred to as phase terminal 3 of the respective motor phase U, V, W) is respectively connected to the center tap of an associated half-bridge 4 of the converter circuit 2. Each half-bridge 4 comprises two power switches 5 and 6, which are in each case preferably embodied as a MOSFET. Via the power switch 5 arranged in each half-bridge 4, the associated motor phase U, V, W can be connected to an operating potential $U_Z$. Via the respective other power switch 6, the motor phase U, V, W can be allocated ground potential (referred to as "ground M" hereinafter for short). Operating potential $U_Z$ and ground M are fed to the converter circuit 2 via a so-called intermediate circuit 7. A so-called freewheeling diode 8 and 9 is connected in parallel with each power switch 5 and 6, respectively.

For driving the power switches 5, 6, a control unit 10 is assigned to the converter circuit 2. The control unit 10 comprises a microcontroller 11, which drives each of the power switches 5, 6 in such a way that, during operation of the motor 1, the armature windings of the motor phases U, V, W generate a rotating magnetic field that drives a rotor (not illustrated more specifically) of the motor 1.

The power switches 5, 6 are driven in a manner dependent on the rotor position according to a so-called commutation scheme. In particular, a so-called bipolar block commutation is used. In this case, during a whole cycle, that is to say a full rotor revolution, within a first (positive) commutation block, each motor phase U, V, W is switched to the operating potential $U_Z$ at least occasionally. During a second (negative) commutation block, the motor phase U, V, W is switched to ground M. Each commutation block extends—relative to the rotor rotation—over an angle-of-rotation range—referred to as driving angle—of less than 180°. Intermediate angle ranges in which the respective motor phase U, V, W is disconnected from the intermediate circuit 7, that is to say in which neither the high-potential-side power switch 5 nor the ground-side power switch 6 of the associated half-bridge 4 is turned on, are therefore formed between the commutation blocks. For generating a three-phase electric current, each motor phase U, V, W is driven in a manner offset by 120° with respect to the other motor phases U, V, W.

For controlling the motor power, the motor phases U, V, W are driven in pulse-width-modulated fashion. In this case, each motor phase U, V, W, in the positive commutation block, is not switched to the operating potential $U_Z$ over the entire driving angle, but rather is operated in periodically pulsed fashion.

In order to synchronize the motor driving with the actual rotor rotation, the sequence of the commutation is "triggered" by a position signal $S_P$. The position signal $S_P$ indicates the points in time at which the rotor passes through a specific rotor position. The position signal $S_P$ is determined, in a manner described in more detail below, on the basis of the voltage induced in a selected motor phase by the rotor rotation (back-EMF). In accordance with FIG. 1, the motor phase V, by way of example, is selected as a reference for determining the back-EMF.

The position determining method performed by means of the control unit 10 is based on the following electrodynamic principles:

The following holds true for the electrical potential at the star point P (referred to hereinafter as star voltage $U_P$):

$$U_P = \frac{U_U + U_V + U_W}{3} \qquad \text{EQU. 1}$$

where $U_U$, $U_V$ and $U_W$ denote the phase voltage of the motor phase U, V and W, respectively, that can be tapped off at the respective phase terminal 3. The following generally holds true for each phase voltage $U_X$ (where X=U, V, W)

$$U_X = U_P + U_{Xind}, \qquad \text{EQU. 2}$$

where $U_{Xind}$ represents the voltage (or back-EMF) induced in the motor phase X=U, V, W. At the zero crossing of the voltage induced in the motor phase V, that is to say for $U_{Vind}=0$, the following correspondingly holds true:

$$U_V = U_P \qquad \text{EQU. 3}$$

The following results from EQU. 1 and 3

$$U_V = U_P = \frac{U_U + U_W}{2} \qquad \text{EQU. 4}$$

for the zero crossing of the back-EMF $U_{Vind}$.

The zero crossing of the back-EMF $U_{Vind}$ in the motor phase V, and the rotor position corresponding to this zero crossing, can be identified according to EQU. 4 from the phase voltage $U_V$ exceeding the average value of the other phase voltages $U_U$ and $U_W$.

The position determining method carried out by means of the control unit 10 is based on this conformity to laws—according to the basic principle. Accordingly, just the phase voltage $U_V$ is detected metrologically. The position signal $S_P$ is generated if the phase voltage $U_V$ exceeds a comparison voltage $U_C$, which is determined on the basis of EQU. 4 (or an equation derived therefrom) in such a way that it corresponds to the phase voltage $U_V$ at a specific value of the back-EMF $U_{Vind}$, in particular the zero crossing. In general, the comparison voltage $U_C$ is chosen in accordance with:

$$U_C = \frac{U_U + U_W}{2} + \Delta Q \qquad \text{EQU. 5}$$

In this case, the phase voltages $U_U$ and $U_W$ incorporated into EQU. 4 and 5 are not measured directly, but rather determined numerically in the microcontroller 11 on the basis of available information about the motor driving. $\Delta Q$ represents a correction factor, which is allocated the value 0 if the motor 1 the position signal $S_P$ is intended to be generated in phase with the zero crossing of the back-EMF $U_{Vind}$. For a pretriggering or posttriggering, $\Delta Q$ is allocated a negative or positive value, respectively.

In the practical realization of the above basic principle, account is taken of the fact that the determination of the rotor position on the basis of EQU. 4 is made more difficult by the pulse width modulation (PWM), especially as both the measured phase voltage $U_V$ and the further phase voltages $U_U$, $U_W$ vary with the PWM pulses at high frequency in a pulsed manner with time. In addition, the profile of the measured phase voltage $U_V$ is disturbed by fluctuations given by switching processes (switching overshoots). The profile of the phase voltage $U_V$ disturbed by PWM pulses and switching overshoots is illustrated schematically by way of example in a temporal diagram in FIG. 2.

In order to simplify the position determining method, therefore, the actual phase voltage $U_V$ is not used for the comparison, rather use is made of a peak value $U_V^*$ of said phase voltage $U_V$, which peak value reproduces, over a predetermined detection time period $T_E$, the maximum value of the phase voltage $U_V$ purged of switching overshoots. The profile of the peak value $U_V^*$ is illustrated in a comparison with the profile of the actual phase voltage $U_V$ in FIG. 2.

The phase voltage $U_V$ is detected by an analog electronic evaluation circuit 12 within the control unit 10. By means of the evaluation circuit 12, in a manner described in greater detail below, a measurement signal $S_{Uv}^*$ corresponding to the peak value $U_V^*$ is generated and fed to an analog connection 13 of the microcontroller 11. On the basis of the peak value $U_V^*$, in the microcontroller 11, the rotor position is then determined numerically and the position signal $S_P$ is generated, in a manner described in greater detail below.

Figure 3:
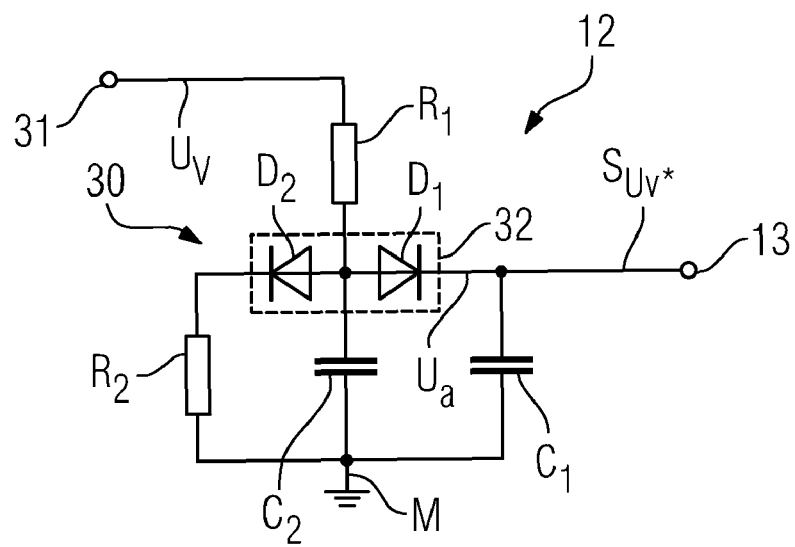
FIG. 3 shows, in an electrical circuit diagram, a first embodiment of the evaluation circuit.

In a first embodiment in accordance with FIG. 3, the evaluation circuit 12 comprises a voltage divider circuit 30, in the framework of which two resistors $R_1$ and $R_2$ are connected in series between ground M and a tap 31 (FIGS. 1, 3) for the phase voltage $U_V$. Connected in parallel with the resistor $R_2$ is a first capacitor $C_1$ with a forward-biased first diode $D_1$ connected upstream. A second diode $D_2$, which is likewise forward-biased and thus connected in parallel with the diode $D_1$, is arranged in the ground-side branch of the voltage divider circuit 30. The evaluation circuit 12 furthermore comprises a second capacitor $C_2$, which is connected in parallel with the diode $D_1$ and the capacitor $C_1$.

On account of the voltage divider circuit 30, the diode $D_1$ is not directly fed the phase voltage $U_V$, but rather a voltage which is approximately proportional thereto and the magnitude of which corresponds to approximately 20% of the phase voltage $U_V$ on account of suitable dimensioning of the resistors $R_1$, $R_2$. Without taking account of the influence of the capacitors $C_1$, $C_2$, the following results computationally for the output voltage present at the output of the diode $D_1$:

$$U_a = \frac{R_2}{R_1 + R_2} \cdot (U_V - U_{D2}) + U_{D2} - U_{D1}, \qquad \text{EQU. 6}$$

where $U_{D1}$ and $U_{D2}$ represent the forward voltages of the diodes $D_1$ and $D_2$, respectively. In a preferred embodiment, the diodes $D_1$ and $D_2$ are chosen to be structurally identical and, in particular, are embodied as an integrated structural unit 32 and therefore have to a good approximation the same forward voltage $U_D = U_{D1} = U_{D2}$. EQU. 6 thereby turns out as $$U_a = \frac{R_2}{R_1 + R_2} \cdot U_V - \frac{R_2}{R_1 + R_2} U_D. \qquad \text{EQU. 7}$$

The capacitor $C_1$ is charged via the diode $D_1$. In this case, the diode $D_1$ prevents the charge from flowing away, such that the charge state of the capacitor $C_1$ is stored. The voltage dropped across the capacitor $C_1$ thereby substantially corresponds to the maximum value assumed by the output voltage $U_a$ during the detection time period $T_E$. In this case, however, momentary voltage spikes such as are caused typically by switching processes, for instance, are absorbed or filtered out by the capacitor $C_2$. The voltage dropped across the capacitor $C_1$ is fed as measurement signal $S_{Uv}^*$ to the analog connection 13 of the microcontroller 11. By means of analog-to-digital conversion, the microcontroller 11 determines the numerical voltage magnitude of the measurement signal $S_{Uv}^*$ and calculates the actual magnitude of the peak value $U_V^*$ therefrom on the basis of stored values for the resistors $R_1$ and $R_2$ and the diode voltage $U_D$.

Figure 2:
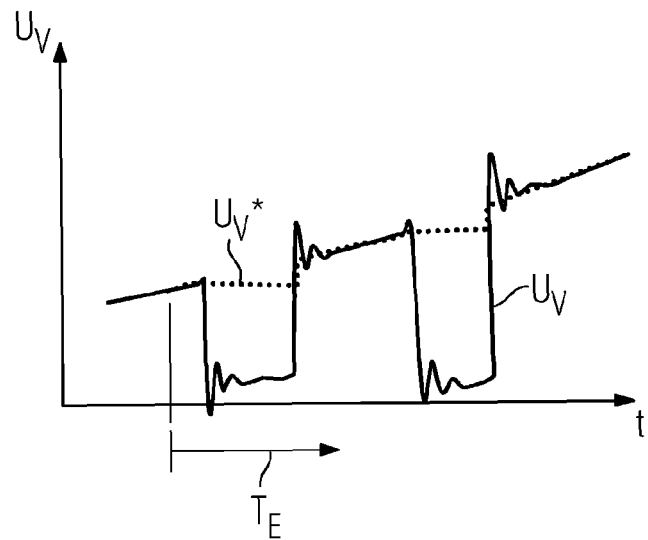
FIG. 2 shows, in a schematically simplified temporal diagram, in a comparison as an excerpt, the profile of the phase voltage in a selected motor phase and of a peak value thereof that is made available by the evaluation circuit.

The detection time period $T_E$ begins with the last discharge of the capacitor $C_1$ (or with the application of the output voltage $U_a$ to the discharged capacitor $C_1$) and lasts until the present point in time or at the longest until the point in time at which the capacitor $C_1$ is discharged anew (see FIG. 2). The analog connection 13 is configured as voltage input during the detection time period $T_E$ and is at a correspondingly high impedance, such that a discharge of the capacitor $C_1$ via the microcontroller 11 is prevented.

For discharging purposes, the analog connection 13 is reconfigured as voltage output and operated with a potential of zero volts. In this state, the analog connection 13 is switched to ground M within the microcontroller 11, such that the charge stored on the capacitor $C_1$ can flow away via the microcontroller 11.

The diode $D_2$ effects an at least partial compensation of tolerances of the forward voltage $U_{D1}$ of the diode $D_1$. This becomes apparent if it is recalled that the following would result without the diode $D_2$ ($U_{D2}=0$) from EQU. 6

$$U_a = \frac{R_2}{R_1 + R_2} \cdot U_V - U_{D1} \qquad \text{EQU. 8}$$

A comparison of EQU. 7 and 8 shows that through the use of the diode $D_2$, tolerances of the forward voltage $U_D=U_{D1}$ are incorporated only in the ratio $R_2:(R_1+R_2)$ and that the influence of the diode $D_1$ is therefore reduced by this factor.

Position identification during motor driving:

The back-EMF $U_{Vind}$ can be detected in the motor phase V only when the latter is de-energized. During the driving of the motor 1, therefore, position identification is possible only in one of the intermediate angle ranges in which the motor phase V is disconnected from the intermediate circuit 7. In this operating state, one of the further motor phases U or W is always switched (at least occasionally) to the operating potential $U_Z$, and the remaining motor phase W or U, respectively, to ground M. EQU. 5 is thereby simplified to $$U_C = \frac{U_Z}{2} + \Delta Q. \qquad \text{EQU. 9}$$

Figure 4:
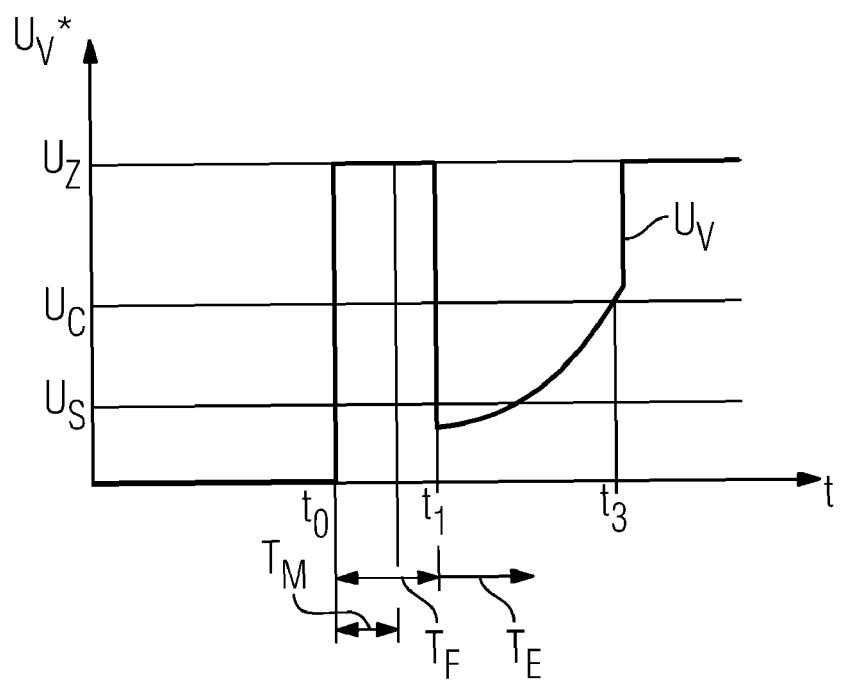
FIG. 4 shows, in a schematically simplified temporal diagram, the profile of a phase voltage upon the commutation of the associated motor phase.

The operating potential $U_Z$ incorporated in EQU. 9 can be stored as a constant in the microcontroller 11. However, the operating potential $U_Z$ is preferably detected metrologically. For this purpose, after the end of a commutation block, the motor phase V is switched to the reference potential $U_Z$ by the driving of the associated high-potential-side power switch 5 momentarily for the duration of a measurement time $T_M$ (FIG. 4). In this case, the reference potential $U_Z$ is detected by means of the evaluation circuit 12 by detection of the peak value $U_V^*$, which corresponds to the operating potential $U_Z$ in this operating state, and is stored in the microcontroller 11 for later use. Before the measurement, the evaluation circuit 12 is reset by the discharging of the capacitor C1.

Preferably, only the positive zero crossing of the back-EMF $U_{Vind}$, that is to say the change in sign of the back-EMF $U_{Vind}$ from negative to positive, is detected during the motor driving. The positive zero crossing of the back-EMF $U_{Vind}$ is effected in each case after the negative commutation block in which the motor phase V was switched to ground M.

Even after the disconnection of the motor phase V, however, the back-EMF cannot be detected immediately. Rather, it is necessary firstly to wait during the duration of a commutation time $T_F$ (FIG. 4) until the freewheeling current that is maintained by self-induction in the motor phase V and flows away via the freewheeling diode 8 has decayed in the motor phase V.

In order to determine the duration of the commutation time $T_F$, the freewheeling current is detected indirectly by means of the peak value $U_V^*$. The procedure according to the measurement principle illustrated schematically on the basis of FIG. 4 is adopted in this case. FIG. 4 shows schematically in simplified fashion a temporal excerpt from the profile of the phase voltage $U_V$. The influence of PWM pulses and switching overshoots on the profile of the phase voltage $U_V$ has been disregarded here for reasons of clarity.

FIG. 4 reveals that the motor phase V is negatively commutated up to a point in time $t_0$ and thus switched to ground M, such that the phase voltage $U_V$ essentially has the value 0 volts. The motor phase V is disconnected from ground M at the point in time $t_0$. On account of the freewheeling current flowing away via the high-potential-side freewheeling diode 8, the phase voltage $U_V$ rises abruptly to a value substantially corresponding to the operating potential $U_Z$. The phase voltage $U_V$ only collapses again at a point in time $t_1$ at which the freewheeling current has decayed, and the commutation time $T_F$ has thus ended.

The commutation time $T_F$ is determined by a procedure in which—after the intermediate circuit voltage $U_Z$ has been determined—by means of the evaluation circuit 12 the peak value $U_V^*$ is repeatedly determined and in the microcontroller 11 is compared numerically with a stored threshold value $U_S$. As long as the peak value $U_V^*$ exceeds the threshold value $U_S$, this is regarded as an indication that the freewheeling current has not yet decayed. In this case, the measurement is repeated immediately or after a predetermined delay time. Before each measurement, the evaluation circuit 12 is reset by the discharging of the capacitor C1.

As soon as it is ascertained, in the course of the comparison described, that the peak value $U_V^*$ falls below the threshold value $U_S$, this is regarded as an indication that the freewheeling current has decayed. The position identification is started in this case.

For identifying the rotor position, the evaluation circuit 12 is reset to the initial state by the discharging of the capacitor C1 and the detection time period $T_E$ is thus started. In the microcontroller 6, the peak value $U_V^*$ fed by the evaluation circuit 12 is then compared continuously or periodically with the comparison value $U_C$ determined according to EQU. 9. If the peak value $U_V^*$ falls below the comparison value $U_C$, then the measurement is repeated immediately or at a predetermined later point in time. As soon as the peak value $U_V^*$ first exceeds the comparison value $U_C$ at a point in time $t_3$ the position signal $S_P$ is generated and the positive commutation of the motor phase V is initiated (in FIG. 4. this can be seen from an abrupt rise in the phase voltage $U_V$ to approximately the magnitude of the operating potential $U_Z$).

Figure 5:
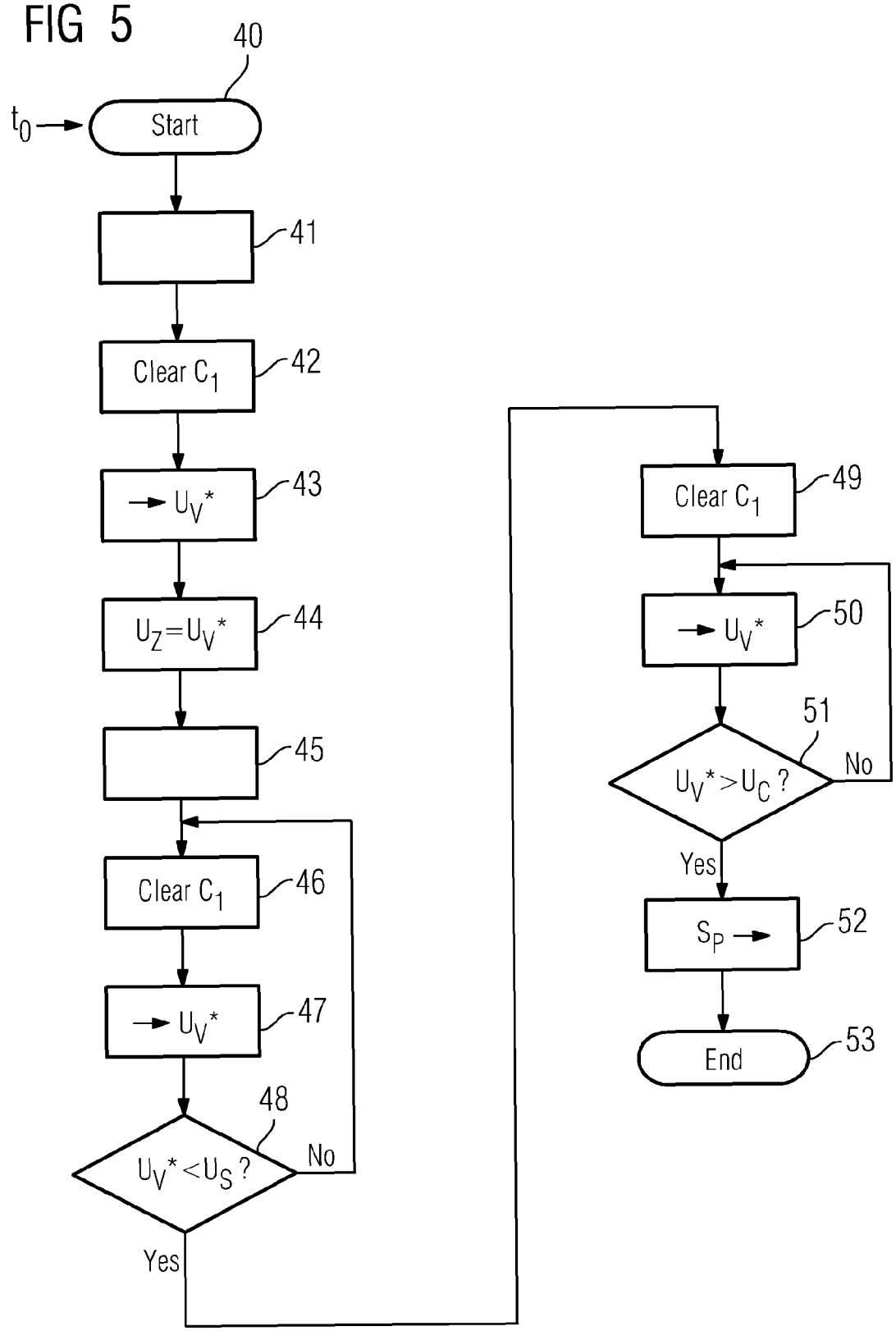
FIG. 5 shows, in a flowchart, a schematic diagram of a method sequence intended for position determination during motor driving.

A method sequence which is described in greater detail on the basis of a flow-chart in FIG. 5, and which is implemented by programming in the microcontroller 11, thus results for the position identification during motor driving:

The microcontroller 11 starts the method once the negative commutation block ends (step 40), and hence at the point in time $t_0$ in accordance with FIG. 4. The point in time $t_0$ is predetermined by the microcontroller 11 anyway for the driving of the converter circuit 2 and is therefore known.

In subsequent steps 41 to 44, firstly the value of the operating potential $U_Z$ is determined. For this purpose, in step 41, the microcontroller turns on the power switch 5 assigned to the motor phase V and thus switches the motor phase V to the operating potential $U_Z$. The microcontroller 11 thereupon carries out a measurement of the peak value $U_V^*$ by resetting the evaluation circuit 12 by clearing the capacitor $C_1$ (step 42) and fetching the present value of the peak value $U_V^*$ (step 43). The peak value $U_V^*$ is stored as value of the operating potential $U_Z$ in step 44.

After the operating potential $U_Z$ has been determined, the microcontroller 11 turns off the power switch 5 assigned to the motor phase V (step 45), in order to disconnect the motor phase V from the operating potential $U_Z$, and determines the commutation time $T_F$ in subsequent steps 46 to 48. For this purpose, the microcontroller 11 once again clears the capacitor $C_1$ (step 46) and fetches the present peak value $U_V^*$ (step 47). The microcontroller 11 subsequently checks in step 48 whether the peak value $U_V^*$ obtained falls below the threshold value $U_S$.

As long as the comparison turns out negative, this is regarded as an indication that the freewheeling current has not yet decayed. In this case, steps 46 to 48 are repeated immediately or after a predetermined delay time.

If the comparison turns out positive, this is regarded as an indication that the freewheeling current has decayed. In this case, the actual position identification is started in accordance with subsequent steps 49 to 52.

At the beginning of the position identification, in step 49 the evaluation circuit 12 is reset by the clearing of the capacitor $C_1$ (step 50). Afterward, the microcontroller 11 fetches the present peak value $U_V^*$ (step 51) and checks whether this value exceeds the comparison voltage $U_C$ calculated according to EQU. 9.

As long as the comparison turns out negative, this is regarded as an indication that the rotor position sought has not yet been attained. Steps 50 and 51 are repeated immediately or after a predetermined delay time. If the comparison turns out positive, this is regarded as an indication that the rotor position sought has been attained. In this case, the microcontroller 11 generates the position signal $S_P$ (step 52) and ends the method (step 53).

Position determination in freewheel:

In freewheel, a position determination on the basis of EQU. 5 would not be possible without further precautions, especially as the phase voltages $U_U$ and $U_W$ are unknown in this state. In order nevertheless to permit position determination even in freewheel with exclusive measurement of the phase voltage $U_V$, defined test voltages $U_{T1}$ and $U_{T2}$ (see FIG. 1) are applied to the other motor phases U, W.

Figure 6:
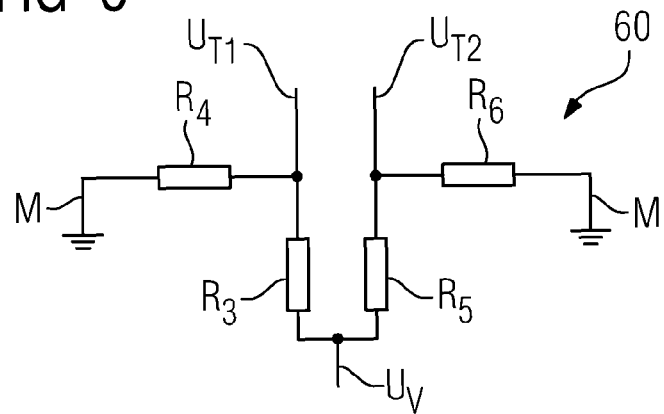
FIG. 6 shows, in an electrical circuit diagram, a voltage divider circuit by means of which a defined test voltage can be applied to the further motor phases in order to permit a position determination even when the electric motor is in freewheel.

For this purpose, said motor phases U, W are connected to a voltage divider circuit 60, which is illustrated in FIG. 6 and which comprises resistors $R_3$ and $R_4$ for providing the test voltage $U_{T1}$ and resistors $R_5$ and $R_6$ for providing the test voltage $U_{T2}$. The resistors $R_3$ to $R_6$ are dimensioned with sufficiently high resistance such that the commutation of the motor phases U and W is not significantly disturbed by the voltage divider circuit 60.

With the relationships $U_U = U_{T1}$ and $U_W = U_{T2}$, EQU. 5 turns out as $$U_C = \frac{U_{T1} + U_{T2}}{2} + \Delta Q \qquad \text{EQU. 10}$$

In order not to obtain incorrect measurements at small rotational speeds, a positive zero crossing is accepted, in the manner of a hysteresis, only when the peak value $U_V^*$ had previously fallen below the comparison voltage $U_C$ decreased by a predetermined hysteresis voltage $U_H$.

Figure 7:
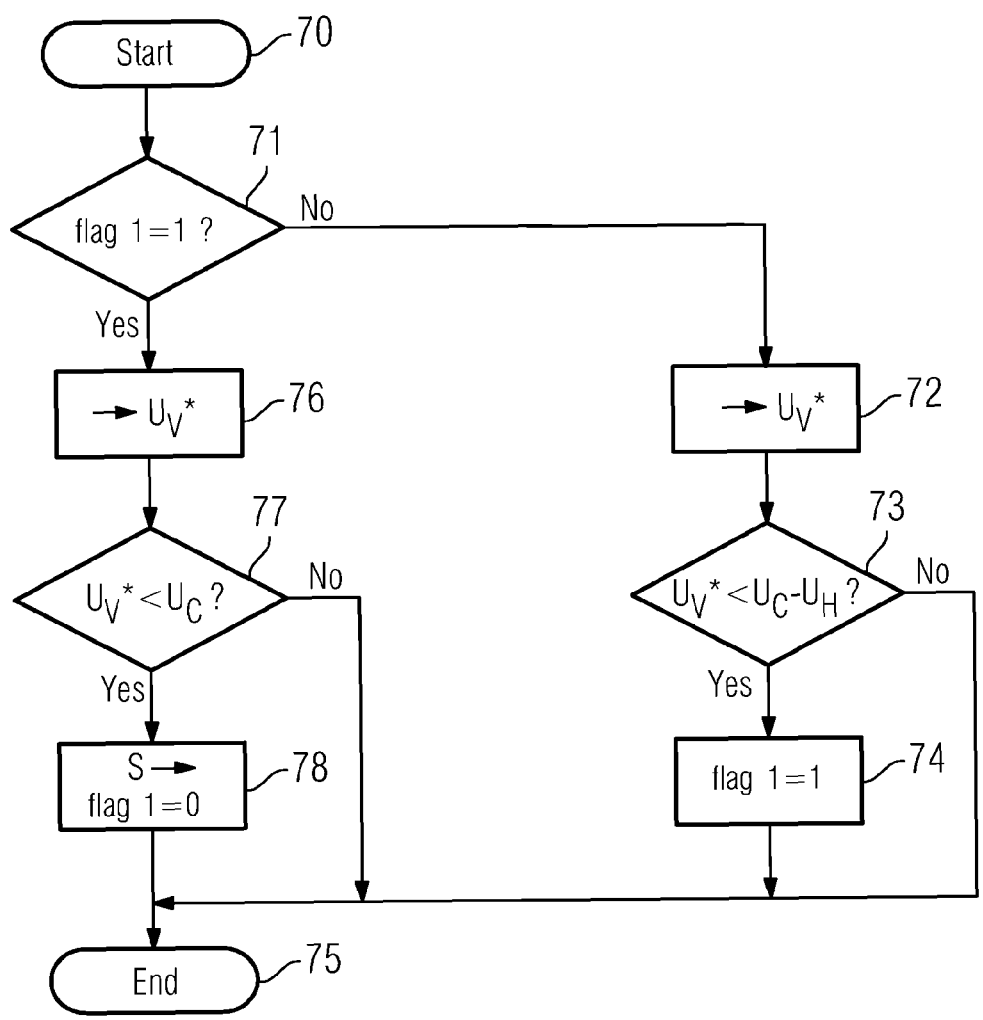
FIG. 7 shows, in an illustration in accordance with FIG. 5, a schematic diagram of a method sequence intended for position determination in freewheel.

This results in a method sequence which is described in greater detail on the basis of a flowchart in FIG. 7:

After the program start (step 70), the microcontroller 11 checks in step 71, in particular by interrogating a control variable (flag1), whether the preconditions for the test for a positive zero crossing are present. If this is not the case, then the microcontroller 11, in step 72, fetches the present peak value $U_V^*$ from the evaluation circuit 12. In step 73, the microcontroller 11 subsequently checks whether the peak value $U_V^*$ falls below the comparison voltage $U_C$ decreased by the hysteresis voltage $U_H$.

If this is the case, then the microcontroller 11 signals (by setting flag1 in step 74) that the conditions for the test for a positive zero crossing are present, resets the evaluation circuit 12 by clearing the capacitor $C_1$ (not illustrated in greater detail) and ends the method implementation (step 75).

If the comparison performed in step 73 turns out negative, then the method implementation is ended immediately.

If, by contrast, it is ascertained in step 71 that the condition (flag1=1) for the test for a positive zero crossing is present, then the microcontroller 11, in step 76, analogously to step 72, fetches the present peak value $U_V^*$ and checks in step 77 whether said peak value $U_V^*$ exceeds the comparison voltage $U_C$ determined according to EQU. 10.

A positive comparison result is regarded as an indication that the rotor position sought has been obtained. In this case, in step 78, the microcontroller 11 generates the position signal $S_P$, signals (by resetting flag1) that the conditions for the test for a positive zero crossing are no longer present, and ends the method implementation.

If the comparison performed in step 77 turns out negative, then this is regarded as an indication that the rotor position sought has not yet been attained. In this case, the method implementation is ended immediately. The above-described method in accordance with steps 70 to 78 is repeated continuously or periodically at short time intervals as long as the motor 1 is de-energized and is therefore potentially in freewheel.

In order to improve the detection accuracy, the above-described method is optionally modified in such a way that the positive and the negative zero crossing of the back-EMF $U_{Vind}$ are detected alternately. The detection of a negative zero crossing is also effected in the above-described manner, in principle, where it should be taken into consideration that the underlying comparison relations are used with opposite signs in the comparison operations in step 73 and step 77. Moreover, it should be taken into consideration that directly before each occasion of fetching the peak value $U_V^*$ in steps 72 and 76, the evaluation circuit 12 is to be reset by the discharging of the capacitor $C_1$.

Figure 8:
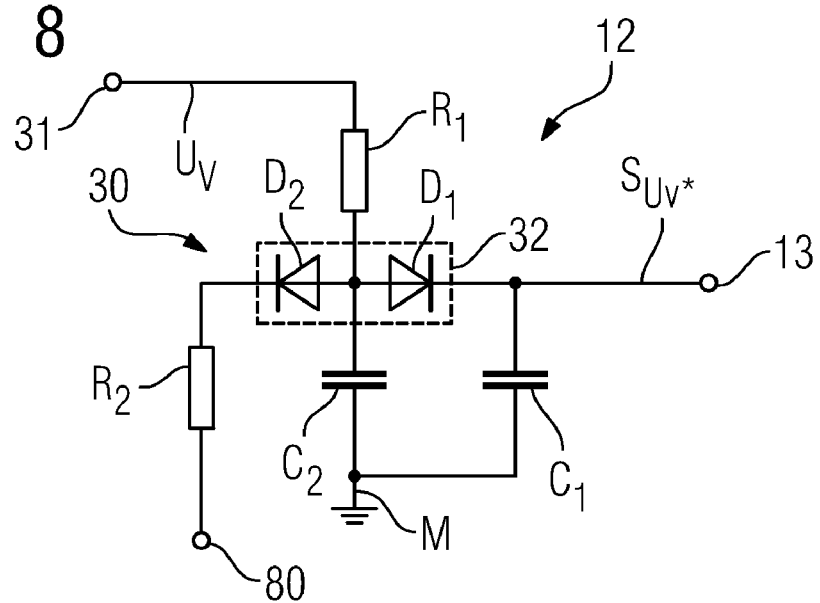
FIG. 8 shows, in an illustration in accordance with FIG. 2, an alternative embodiment of the evaluation circuit.
Figure 9:
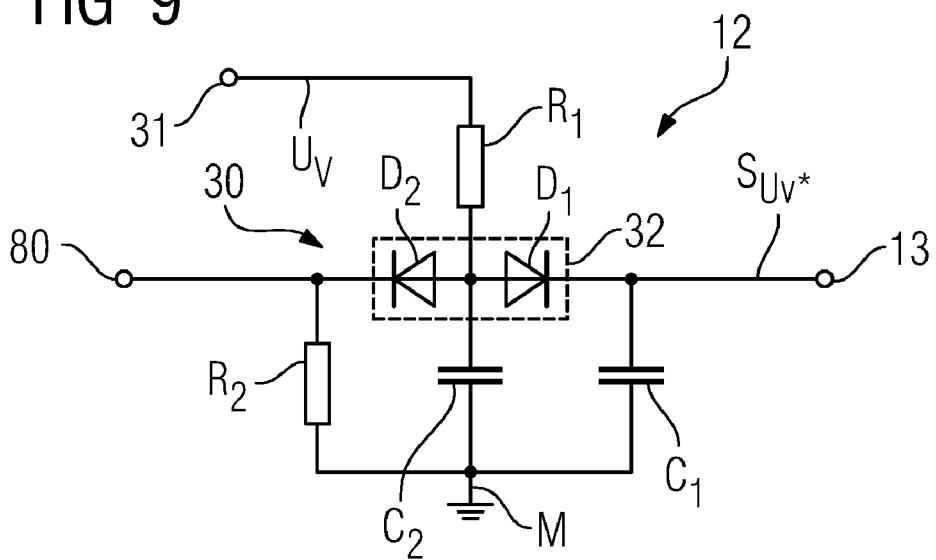
FIG. 9 shows, in an illustration in accordance with FIG. 2, a further embodiment of the evaluation circuit.

FIGS. 8 and 9 illustrate two alternative embodiments of the evaluation circuit 12. These embodiments differ from the embodiment in accordance with FIG. 2 in that the evaluation circuit 12—as indicated in dashed fashion in FIG. 1—is additionally connected to a digital connection 80 of the microcontroller 11, such that the voltage divider circuit 30 is reversibly activatable and deactivatable from the microcontroller 11 via the digital connection 80.

A deactivation of the voltage divider circuit 30 is expedient particularly at small motor rotational speeds, especially as the back-EMF $U_{Vind}$, too, is only low in this case and the phase voltage $U_V$ thus has only a weak temporal change in the vicinity of the zero crossing of the back-EMF $U_{Vind}$.

In the embodiment in accordance with FIG. 8, the ground-side output of the resistor $R_2$ is not connected directly to ground M, but rather is connected to the digital connection 80 of the microcontroller 11. In order to activate the voltage divider circuit 30 in this embodiment, the digital connection 80 is operated as output with an output potential of zero volts, such that the resistor $R_2$ is connected to ground M within the microcontroller 11. In this case, the evaluation circuit 12 in accordance with FIG. 8 functions analogously to the exemplary embodiment in accordance with FIG. 2.

In order to deactivate the voltage divider circuit 30, the operating potential $U_V$ is output via the digital connection 80 of the microcontroller 11 operated as voltage output. The diode $D_2$ is thereby inhibited with the consequence that the measurement signal $S_{Uv}^*$ contains the peak value $U_V^*$ in the division ratio 1:1.

In the variant of the evaluation circuit 12 that is illustrated in FIG. 9, the digital connection 80 of the microcontroller 11, in a differing manner, is connected to a contact location interposed between the diode $D_2$ and the resistor $R_2$.

In this embodiment, for activating the voltage divider circuit 30, the digital output 80 is operated as voltage input and therefore remains without influence for the functioning of the voltage divider circuit 30. For deactivating the voltage divider circuit 30, by contrast, the operating potential $U_Z$ is output via the digital connection 80, now operated as voltage output, whereby the diode $D_2$ is once again inhibited.

The invention claimed is:

1. A method for determining the position of the rotor in a brushless and sensorless polyphase electric motor,
in which, after the disconnection of a first motor phase from the reference potentials of an intermediate circuit, during a detection time period, a phase voltage present at said motor phase on the terminal side is detected,
in which a peak value of the detected phase voltage is determined over the detection time period,
in which the peak value is compared with a comparison value, and
in which a position signal is generated if the peak value exceeds the comparison value, wherein the comparison value is determined numerically in such a way that it corresponds to the value of the phase voltage at a zero crossing of a voltage induced in the first motor phase or to a value increased or decreased in relation thereto by a predetermined correction value.

2. The method of claim 1, wherein the phase voltage of the first motor phase is detected exclusively.

3. The method of claim 1, wherein the peak value is detected as an analog signal from a circuitry standpoint.

4. The method of claim 1, wherein fluctuations governed by switching processes, in the course of the peak value detection, are filtered out from the phase voltage.

5. The method of claim 1, wherein the comparison of the peak value with the comparison value is effected numerically.

6. The method of claim 1, wherein the comparison value is determined according to the formula $U_C \cong U_Z/2 + \Delta Q$, wherein $U_Z$ denotes an intermediate circuit operating potential, and $\Delta Q$ denotes the correction value that can be predetermined as desired.

7. The method of claim 6, wherein the intermediate circuit operating potential is derived from a measurement of the peak value of the phase voltage which precedes the detection time period, wherein the first motor phase is connected to the intermediate circuit operating potential for said measurement.

8. The method of claim 1, wherein the detection time period is preceded by a commutation time period, which succeeds the disconnection of the first motor phase and the duration of which is determined by the decay of a motor phase current flowing through the first motor phase, and wherein the commutation time period, with repeated detection and analysis of the peak value of the phase voltage, is ended if the peak value falls below a predetermined threshold value.

9. A device for determining the position of the rotor in a polyphase brushless electric motor, comprising a microcontroller and an analog electronic evaluation circuit,
wherein the evaluation circuit is designed to detect a phase voltage present at a first motor phase on the terminal side, and to determine a peak value of said phase voltage,
wherein the evaluation circuit, for outputting the peak value determined to the microcontroller, is connected up to an analog connection of said microcontroller,
wherein the microcontroller is designed to compare the peak value with a comparison value, and to generate a position signal if the peak value exceeds the comparison value, and
wherein the microcontroller is designed to determine the comparison value in such a way that it corresponds to the value of the phase voltage at a zero crossing of a voltage induced in the first motor phase or to a value increased or decreased in relation thereto by a predetermined correction value.

10. The device of claim 9, wherein the evaluation circuit comprises a first capacitor connected up to the first motor phase on the terminal side, and also a first diode connected upstream of said capacitor in the forward direction.

11. The device of claim 10, wherein a voltage substantially proportional to the phase voltage is fed to the first diode via a voltage divider circuit connected upstream.

12. The device of claim 11, wherein, within the voltage divider circuit a second diode is connected in parallel with the first diode.

13. The device of claim 12, wherein the second diode is embodied structurally identically to the first diode.

14. The device of claim 11, wherein the voltage divider circuit is reversibly activatable and deactivatable.

15. The device of claim 14, wherein the voltage divider circuit is connected to a digital connection of the microcontroller for activation and for deactivation.

16. The device of claim 10, wherein a second capacitor, for filtering out fluctuations of the phase voltage that are governed by switching processes, is connected in parallel with the first capacitor and the first diode.

17. The device of claim 9, wherein a defined test voltage is applied to the or each further motor phase.

18. The device of claim 17, wherein, for applying the test voltage, the or each further motor phase is connected to a voltage divider circuit.

19. The device of claim 9, wherein the analog connection of the microcontroller that is connected to the evaluation circuit can be configured for detecting the peak value as input, and for resetting the evaluation circuit to an initial state as output.

20. The device of claim 13, wherein the second diode is embodied integrally in the framework of a common component with the first diode.

* * * * *